US007503234B2

(12) United States Patent
Armstrong et al.

(10) Patent No.: US 7,503,234 B2
(45) Date of Patent: Mar. 17, 2009

(54) ONE LEVER TILT AND TELESCOPE MECHANISM

(75) Inventors: Ray G. Armstrong, Bay City, MI (US); Richard P. Nash, Frankenmuth, MI (US); Neal R. Roller, Essexville, MI (US); Philip J. McCarthy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 607 days.

(21) Appl. No.: 11/138,115

(22) Filed: May 26, 2005

(65) Prior Publication Data

US 2006/0266152 A1 Nov. 30, 2006

(51) Int. Cl.
*B62D 1/18* (2006.01)

(52) U.S. Cl. .......................................... 74/493; 280/775

(58) Field of Classification Search .................. 74/493, 74/492, 56, 57, 527, 531, 541, 567, 569, 74/497, 502.2–502.6
See application file for complete search history.

(56) References Cited

U.S. PATENT DOCUMENTS

| 3,285,090 | A |   | 11/1966 | Cranbury |           |
|-----------|---|---|---------|----------|-----------|
| 4,046,024 | A | * | 9/1977  | Broucksou | 74/493   |
| 4,527,444 | A | * | 7/1985  | McKee et al. | 74/493 |
| 4,561,323 | A |   | 12/1985 | Stromberg |          |
| 4,593,577 | A |   | 6/1986  | Kinoshita |          |
| 4,599,500 | A |   | 7/1986  | Wilcox    |          |
| 4,607,540 | A |   | 8/1986  | Kinoshita et al. |   |
| 4,709,592 | A |   | 12/1987 | Andersson |          |
| 4,753,121 | A | * | 6/1988  | Venable et al. | 74/493 |
| 4,793,204 | A | * | 12/1988 | Kubasiak  | 74/493   |
| 4,993,279 | A |   | 2/1991  | Doescher et al. |    |

(Continued)

*Primary Examiner*—Richard W L Ridley
*Assistant Examiner*—Phillip Johnson
(74) *Attorney, Agent, or Firm*—Thomas N. Twoney

(57) ABSTRACT

A steering column assembly has a steering column with a longitudinal axis and disposable in a vehicle for tilting movement and telescoping movement. A wedge lock is engaged with the steering column and moveable between a first unlocked position and a first locked position along a first path to selectively lock the steering column with respect to the telescoping movement. A force required to move the wedge lock increases along the first path from the first unlocked position to the first locked position. A lever is pivotally engaged with the steering column about a pivot axis for rotation between an adjusting position and a locking position. The wedge lock moves from the first unlocked position to the first locked position along the first path in response to rotation of the lever from the adjusting position to the locking position. A cable assembly includes a cable with first and second ends and a sheath substantially encircling the cable. The first end is engaged with the lever to move in response to rotation of the lever. A tilt lock member engaged with the steering column is moveable between a second unlocked position and a second locked position along a second path to selectively lock the steering column with respect to the tilting movement. The second end of the cable is engaged with the tilt lock member such that the tilt lock member moves from the second unlocked position to the second locked position along the second path in response to rotation of the lever from the adjusting position to the locking position. The steering column assembly also includes a biasing device urging the tilt lock member to the locked position and cooperating with the lever to offset the force required to move the wedge lock from the first unlocked position to the first locked position along the first path.

7 Claims, 3 Drawing Sheets

U.S. PATENT DOCUMENTS

| | | | |
|---|---|---|---|
| 5,025,679 A | 6/1991 | Yamamoto | |
| 5,078,022 A | 1/1992 | Ichikawa | |
| 5,117,707 A | 6/1992 | Kinoshita et al. | |
| 5,265,492 A | 11/1993 | Snell | |
| 5,339,706 A | 8/1994 | Freeman | |
| 5,361,646 A * | 11/1994 | Venable | 74/531 |
| 5,426,994 A | 6/1995 | Khalifa et al. | |
| 5,439,252 A * | 8/1995 | Oxley et al. | 280/775 |
| 5,509,325 A | 4/1996 | Thomas | |
| 5,531,317 A | 7/1996 | Tomaru | |
| 5,570,610 A | 11/1996 | Cymbal | |
| 5,605,351 A | 2/1997 | Higashino | |
| 5,657,668 A | 8/1997 | Hibino et al. | |
| 5,704,641 A | 1/1998 | Shimizu et al. | |
| 5,711,189 A * | 1/1998 | Cartwright et al. | 74/493 |
| 5,722,299 A | 3/1998 | Yamamoto et al. | |
| 5,820,163 A * | 10/1998 | Thacker et al. | 280/775 |
| 5,857,703 A | 1/1999 | Kinoshita et al. | |
| 5,931,501 A | 8/1999 | Baumann et al. | |
| 5,979,265 A * | 11/1999 | Kim et al. | 74/493 |
| 5,988,679 A | 11/1999 | Schelling et al. | |
| 6,035,739 A | 3/2000 | Milton | |
| 6,036,228 A * | 3/2000 | Olgren et al. | 280/775 |
| 6,062,101 A | 5/2000 | Higashino | |
| 6,073,695 A | 6/2000 | Crawford et al. | |
| 6,189,405 B1 * | 2/2001 | Yazane | 74/493 |
| 6,205,882 B1 | 3/2001 | Jolley | |
| 6,223,620 B1 | 5/2001 | Jolley | |
| 6,237,439 B1 * | 5/2001 | Weber et al. | 74/493 |
| 6,244,128 B1 * | 6/2001 | Spencer et al. | 74/493 |
| 6,272,945 B1 * | 8/2001 | Jolley | 74/493 |
| 6,460,427 B1 * | 10/2002 | Hedderly | 74/493 |
| 6,467,367 B2 * | 10/2002 | Kim et al. | 74/493 |
| 6,467,807 B2 * | 10/2002 | Ikeda et al. | 280/775 |
| 6,481,310 B2 | 11/2002 | Janeczko et al. | |
| 6,557,434 B2 | 5/2003 | Armstrong et al. | |
| 6,623,036 B2 | 9/2003 | Yamamura et al. | |
| 6,695,349 B2 * | 2/2004 | Bohlen et al. | 280/775 |
| 7,281,448 B2 * | 10/2007 | Li et al. | 74/493 |
| 7,306,259 B2 * | 12/2007 | Tinnin et al. | 280/775 |
| 2002/0089161 A1 * | 7/2002 | Yamamura et al. | 280/777 |
| 2003/0101839 A1 * | 6/2003 | Duncan et al. | 74/493 |
| 2003/0172766 A1 * | 9/2003 | Masucci | 74/493 |
| 2004/0104566 A1 * | 6/2004 | Adoline et al. | 280/775 |
| 2005/0172751 A1 * | 8/2005 | Hong et al. | 74/493 |
| 2005/0204852 A1 * | 9/2005 | Li et al. | 74/492 |
| 2006/0169089 A1 * | 8/2006 | Ohtsu | 74/493 |

* cited by examiner

US 7,503,234 B2

ONE LEVER TILT AND TELESCOPE MECHANISM

FIELD OF THE INVENTION

The invention relates to a steering column of a vehicle and more particularly to a steering column adjustable in tilt and telescope and a lock for locking the adjustable steering column.

BACKGROUND OF THE INVENTION

Vehicles can be equipped with steering columns that adjust the position of the steering wheel to enhance the comfort and safety of the driver. For example, the steering column can telescope to move closer to and away from the driver. Also, the position of the steering wheel can be tilted relative to other components of the column. These features cooperate to enable the driver to adjust the steering wheel to a desired, convenient position for operating the vehicle, and for enabling the wheel to be moved out of the way to provide greater access to getting into and out of the driver's seat of the vehicle. Adjustable steering columns include locks for preventing movement of the steering column in tilt or telescope after the desired position of the steering wheel has been selected.

SUMMARY OF THE INVENTION AND ADVANTAGES

The invention provides a steering column assembly having a steering column defining a longitudinal axis. The steering column is disposable in a vehicle for tilting movement and telescoping movement. The steering column assembly also includes a wedge lock engaged with the steering column and moveable between a first unlocked position and a first locked position along a first path to selectively lock the steering column with respect to the telescoping movement. A force required to move the wedge lock increases along the first path from the first unlocked position to the first locked position. The steering column assembly also includes a lever pivotally engaged with the steering column about a pivot axis for rotation between an adjusting position and a locking position. The wedge lock and the wedge lock are substantially adjacent to one another along the longitudinal axis. The lever is engaged with the wedge lock such that the wedge lock moves from the first unlocked position to the first locked position along the first path in response to rotation of the lever from the adjusting position to the locking position. The steering column assembly also includes a cable assembly having a cable with first and second ends and a sheath substantially encircling the cable. The first end is engaged with the lever to move in response to rotation of the lever. The steering column assembly also includes a tilt lock member engaged with the steering column and moveable between a second unlocked position and a second locked position a long a second path to selectively lock the steering column with respect to the tilting movement. The second end of the cable is engaged with the tilt lock member such that the tilt lock member moves from the second unlocked position to the second locked position along the second path in response to rotation of the lever from the adjusting position to the locking position. The steering column assembly also includes a biasing device urging the tilt lock member to the locked position and cooperating with the lever to offset the force required to move the wedge lock from the first unlocked position to the first locked position along the first path.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
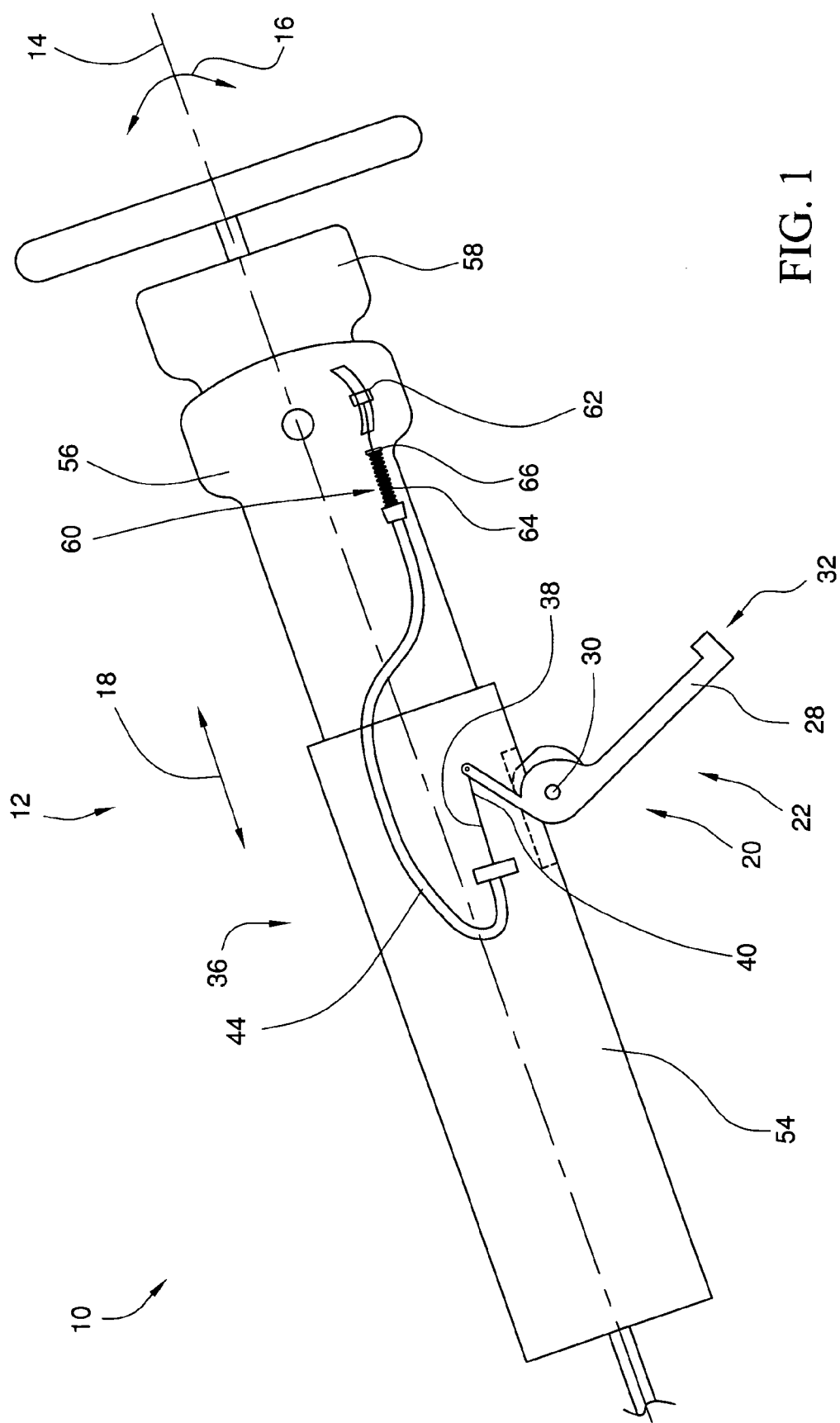
FIG. 1 is a side view of a steering column according to the exemplary embodiment of the invention.
Figure 3:
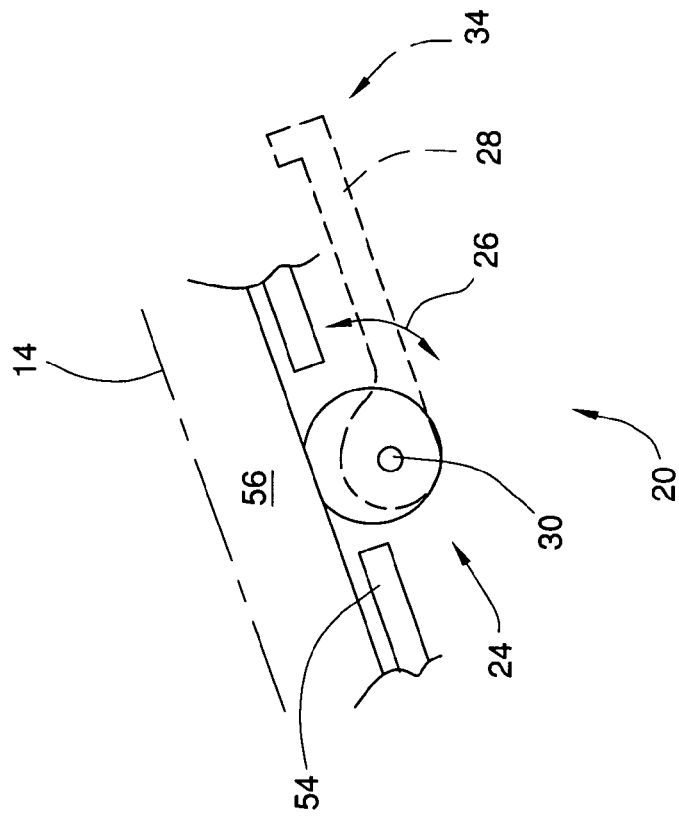
FIG. 3 is a detail view showing the telescoping lock portion of the steering column disposed in the locked position.
Figure 2:
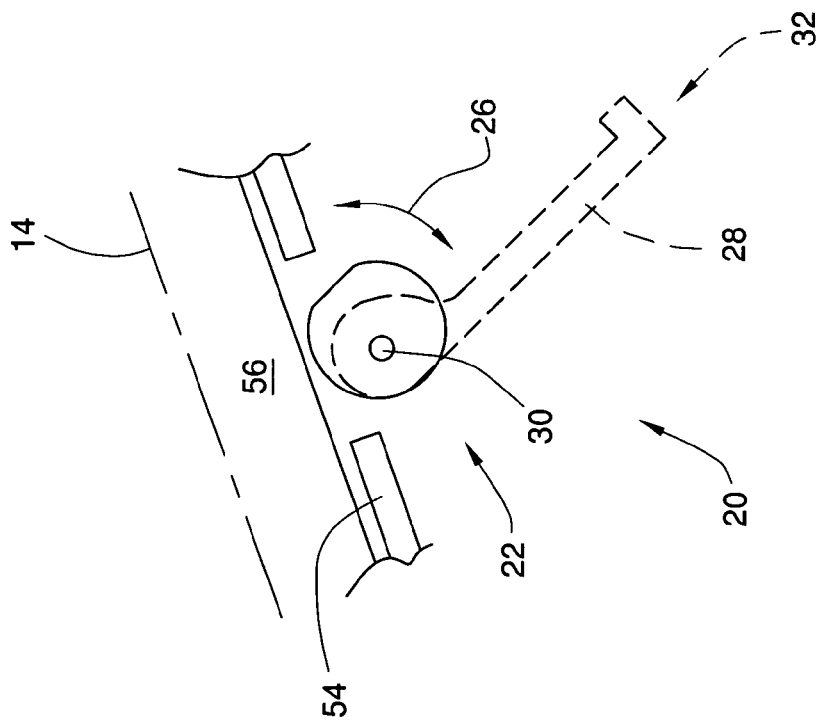
FIG. 2 is a detail view showing a telescoping lock portion of the steering column disposed in the unlocked position.
Figure 5:
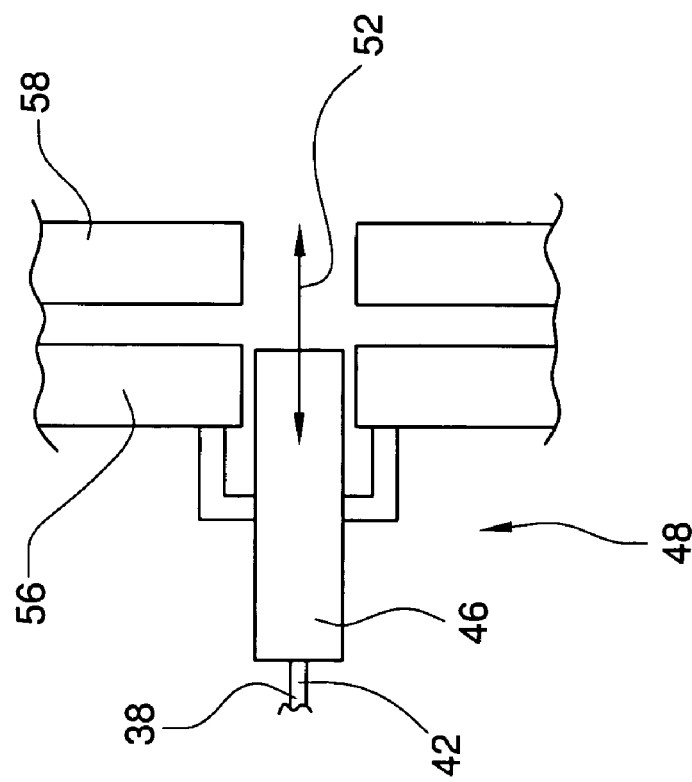
FIG. 5 is a detail view showing the tilting lock portion of the steering column disposed in the unlocked position.
Figure 4:
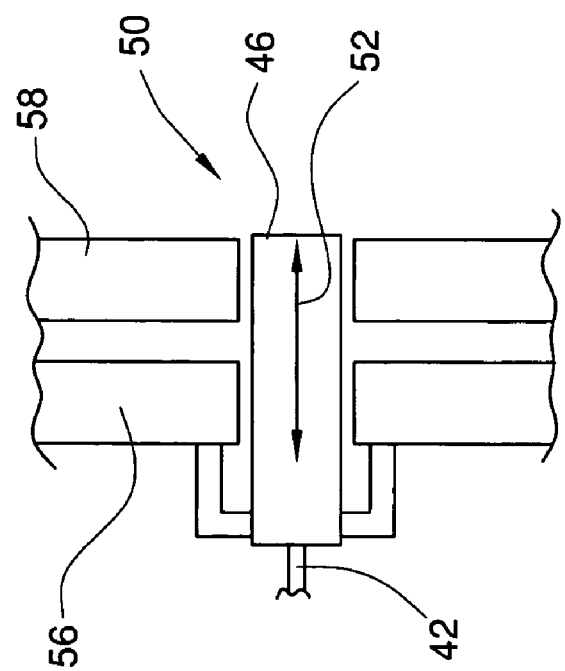
FIG. 4 is a detail view showing a tilting lock portion of the steering column disposed in the locked position.

The invention provides a steering column assembly 10 having a steering column 12 defining a centered longitudinal axis 14. The steering column 12 is disposable in a vehicle for tilting movement 16 and telescoping movement 18. The steering column 12 includes a first steering column jacket 54 substantially fixedly mountable to the vehicle. The first steering column jacket 54 can be fixed to the vehicle during normal vehicle handling and release from the vehicle in response to an impact situation. The steering column 12 also includes a second steering column jacket 56 engaged with the first steering column jacket 54 for the telescoping movement 18. The steering column 12 also includes a tilt housing 58 pivotally engaged with the second steering column jacket 56.

The steering column assembly 10 also includes a wedge lock 20 engaged with the steering column 12. The wedge lock 20 is pivotally engaged with the steering column 12, being fixed with respect to the longitudinal axis 14 and moveable between a first unlocked position 22 and a first locked position 24 along a first path 26. The first path 26 is arcuate and the wedge lock 20 rotates between the first unlocked position 22 and the first locked position 24 to selectively lock the steering column 12 with respect to the telescoping movement 18. A force required to move the wedge lock 20 increases along the first path 26 from the first unlocked position 22 to the first locked position 24. The wedge lock 20 is operably disposed between the first and second steering column jackets 54, 56 at the first locked position 24 and spaced from the second steering column jacket 56 at the first unlocked position 22.

The steering column assembly 10 also includes a lever 28 pivotally engaged with the steering column 12. The lever 28 pivots, or rotates, about a pivot axis 30 between an adjusting position 32 and a locking position 34. The lever 28 and the wedge lock 20 are substantially adjacent to one another along the longitudinal axis 14. In the exemplary embodiment of the invention, the lever 28 and wedge lock 20 are disposed at the same position along the longitudinal axis, aligned on the pivot axis 30. The lever 28 is engaged with the wedge lock 20 such that the wedge lock 20 moves from the first unlocked position 22 to the first locked position 24 along the first path 26 in response to rotation of the lever 28 from the adjusting position 32 to the locking position 34.

The steering column assembly 10 also includes a cable assembly 36 having a cable 38 with first and second ends 40, 42 and a sheath 44 substantially encircling the cable 38. The sheath 44 is fixed at one end to the first steering column jacket 54 and at the other end with the second steering column jacket 56. The cable 38 slides in the sheath 44. The sheath 44 is long enough to accommodate the telescopic movement of the first and second steering column jackets 54, 56. The first end 40 is engaged with the lever 28 to move in response to rotation of the lever 28. In the exemplary embodiment of the invention, the first end 40 of the cable 38 moves away from the end of sheath 44 fixed to the first steering column jacket 54 in response to rotation of the lever 28 from the locking position 34 to the adjusting position 32.

The steering column assembly 10 also includes a tilt lock member 46 engaged with the steering column 12. The tilt lock member 46 is moveable between a second unlocked position 48 and a second locked position 50 along a second path 52 to selectively lock the steering column 12 with respect to the tilting movement 16. The second end 42 of the cable 38 is engaged with the tilt lock member 46 such that the tilt lock member 46 moves from the second unlocked position 48 to the second locked position 50 along the second path 52 in response to rotation of the lever 28 from the adjusting position 32 to the locking position 34. The tilt lock member 46 is operably disposed between the tilt housing 58 and the second steering column jacket 56 at the second locked position 50 to prevent tilting movement 16. In the exemplary embodiment of the invention, the second end 42 of the cable 38 moves toward the end of the sheath 44 fixed to the second steering column jacket 56 in response to rotation of the lever 28 from the locking position 34 to the adjusting position 32. The second end 42 extends from the end of the sheath 44 fixed to the second steering column jacket 56 substantially parallel to the longitudinal axis 14 and is directed toward the longitudinal axis 14 by a bracket 62.

The steering column assembly 10 also includes a biasing device 60 urging the tilt lock member 46 to the locked position and cooperating with the lever 28 to offset the force required to move the wedge lock 20 from the first unlocked position 22 to the first locked position 24 along the first path 26. In the exemplary embodiment of the invention, the biasing device 60 includes a spring 64 and a washer 66. The washer 66 is fixed to the cable 38 and the spring is disposed between the washer 66 and the end of the sheath 44 fixed to the second steering column jacket 56. The biasing device 60 is compressed in response to rotation of the lever 28 from the locking position 34 to the adjusting position 32.

As set forth above, the force required to move the wedge lock 20 increases along the first path 26 from the first unlocked position 22 to the first locked position 24. The biasing device 60 is disposed to act on the lever 28 in a direction opposite the wedge lock 20. For example, when the lever 28 is moving from the adjusting position 32 to the locking position 34, the wedge lock 20 will act against movement of the lever 28. The biasing device 60, on the other hand, will urge the lever 28 to the locking position 34 through the cable 38. When the lever 28 is moving from the locking position 34 to the adjusting position 32, the release of the wedge lock 20 will urge the lever 28 to the adjusting position 32. The biasing device 60, on the other hand, will act against movement of the lever 28 through the cable 38. The cooperation between the wedge lock 20 and the biasing device 60 advantageously assists the driver in moving the lever 28.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising:
   a steering column including a first steering column jacket extending along a longitudinal axis, a second steering column jacket telescopically engaged with said first steering column jacket, and a tilt housing pivotally engaged with said second steering column jacket, wherein said steering column is disposable in a vehicle for tilting movement between said tilt housing and said second steering column jacket and telescoping movement between said first and second steering column jackets;
   a wedge lock coupled to said steering column and moveable between a first unlocked position and a first locked position along a first path to selectively lock said steering column with respect to said telescoping movement;
   a lever pivotally coupled to said steering column for rotation about a pivot axis between an adjusting position and a locking position and attached to said wedge lock for moving said wedge lock from said first unlocked position to said first locked position along said first path in response to rotation of said lever from said adjusting position to said locking position;
   a cable assembly including a cable having first and second ends and a sheath substantially encircling said cable with said first end of said cable coupled to said lever and linearly moveable relative to said sheath in response to rotation of said lever between said adjusting position and said locking position;
   a tilt lock member coupled to said steering column and moveable from a second unlocked position into a second locked position along a second path to selectively lock said tilt housing relative to said second steering column jacket to prevent said tilting movement, with said second end of said cable attached to said tilt lock member such that said tilt lock member moves from said second unlocked position to said second locked position along said second path in response to rotation of said lever from said adjusting position to said locking position; and
   a biasing device coupled to said cable and biasing against said sheath for urging said tilt lock member into said locked position and cooperating with said lever to offset a force required to move said wedge lock from said first unlocked position to said first locked position along said first path;
   wherein said tilt lock member is coupled to one of said second steering column jacket and said tilt housing and slideably moveable along said second path into interlocking engagement with the other of said second steering column jacket and said tilt housing such that said tilt lock member is linearly moveable between said second unlocked position and said second locked position.

2. An assembly as set forth in claim 1 wherein said tilt lock member is coupled to said second steering column jacket and linearly moveable into interfering engagement with said tilt housing in response to said linear movement of said cable.

3. An assembly as set forth in claim 2 wherein said tilt housing defines a slot for slideably receiving said tilt lock member when said tilt lock member is in said second locked position.

4. An assembly as set forth in claim 3 further comprising a bracket attached to said second steering column jacket for directing said linear movement of said cable generally perpendicular to said longitudinal axis.

5. A steering column assembly comprising:

a steering column including a first steering column jacket extending along a longitudinal axis, a second steering column jacket telescopically engaged with said first steering column jacket, and a tilt housing pivotally engaged with said second steering column jacket, wherein said steering column is disposable in a vehicle for tilting movement between said tilt housing and said second steering column jacket and telescoping movement between said first and second steering column jackets;

a wedge lock coupled to said steering column and moveable between a first unlocked position and a first locked position along a first path to selectively lock said steering column with respect to said telescoping movement;

a lever pivotally coupled to said steering column for rotation about a pivot axis between an adjusting position and a locking position and attached to said wedge lock for moving said wedge lock from said first unlocked position to said first locked position along said first path in response to rotation of said lever from said adjusting position to said locking position;

a cable assembly including a cable having first and second ends and a sheath substantially encircling said cable with said first end of said cable coupled to said lever and linearly moveable relative to said sheath in response to rotation of said lever between said adjusting position and said locking position;

a tilt lock member coupled to said steering column and moveable from a second unlocked position into a second locked position along a second path to selectively lock said tilt housing relative to said second steering column jacket to prevent said tilting movement, with said second end of said cable attached to said tilt lock member such that said tilt lock member moves from said second unlocked position to said second locked position along said second path in response to rotation of said lever from said adjusting position to said locking position; and a biasing device coupled to said cable and biasing against said sheath for urging said tilt lock member into said locked position and cooperating with said lever to offset a force required to move said wedge lock from said first unlocked position to said first locked position along said first path;

wherein said wedge lock is coupled to one of said first steering column jacket and said second steering column jacket and wedges against the other of said first steering column jacket and said second steering column jacket when in said first locked position.

6. An assembly as set forth in claim 5 wherein said lever and said wedge lock are coupled to said first steering column jacket and said wedge lock defines a cam surface for engaging said second steering column jacket when said wedge lock is in said first locked position such that the force required to move said wedge lock increases along said first path from said first unlocked position to said first locked position.

7. An assembly as set forth in claim 6 wherein said wedge lock defines an aperture concentric with said pivot axis with said cam profile eccentrically spaced radially about said aperture.

* * * * *